April 15, 1941.  J. H. WHEELOCK  2,238,144
ALARM SIGNAL SYSTEM
Filed June 22, 1936    7 Sheets-Sheet 1

Inventor:
John H. Wheelock
By
Owen W. Kennedy
Attorney

April 15, 1941.  J. H. WHEELOCK  2,238,144
ALARM SIGNAL SYSTEM
Filed June 22, 1936  7 Sheets-Sheet 2

Inventor:
John H. Wheelock
By Owen W. Kennedy
Attorney

April 15, 1941.  J. H. WHEELOCK  2,238,144
ALARM SIGNAL SYSTEM
Filed June 22, 1936  7 Sheets-Sheet 3
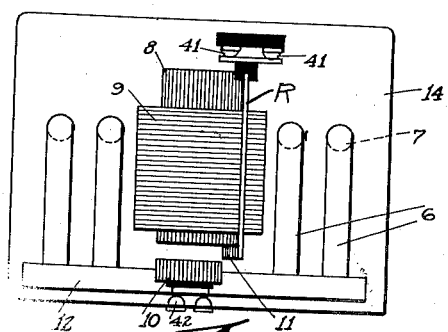
Fig. 4.
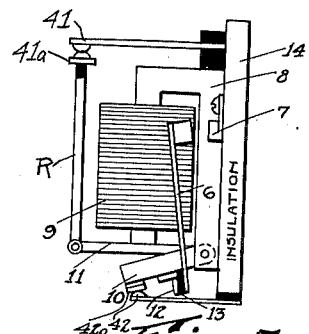
Fig. 5.
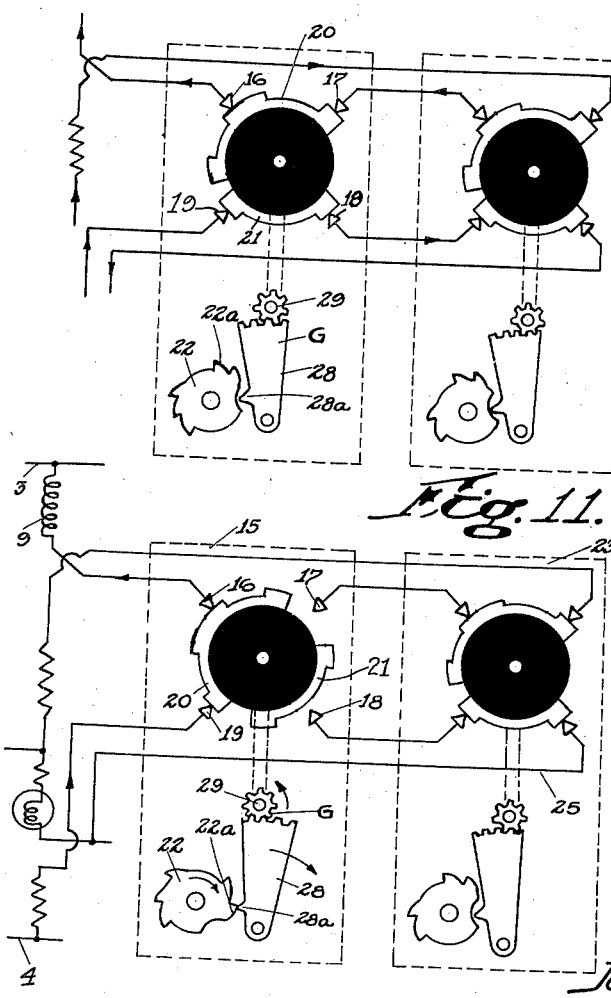
Fig. 11.
Fig. 12.
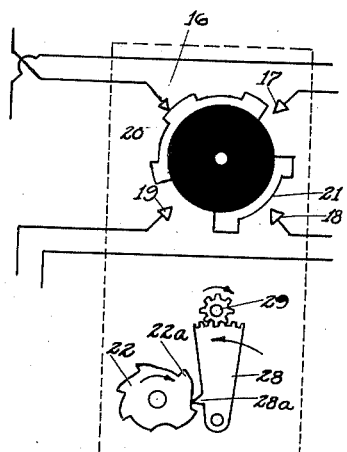
Fig. 13.
Inventor:
John H. Wheelock
By Owen W. Kennedy
Attorney April 15, 1941.  J. H. WHEELOCK  2,238,144
ALARM SIGNAL SYSTEM
Filed June 22, 1936    7 Sheets-Sheet 4

Inventor:
John H. Wheelock
By Owen W. Kennedy
Attorney

Inventor
John H. Wheelock
By Owen W. Kennedy
Attorney

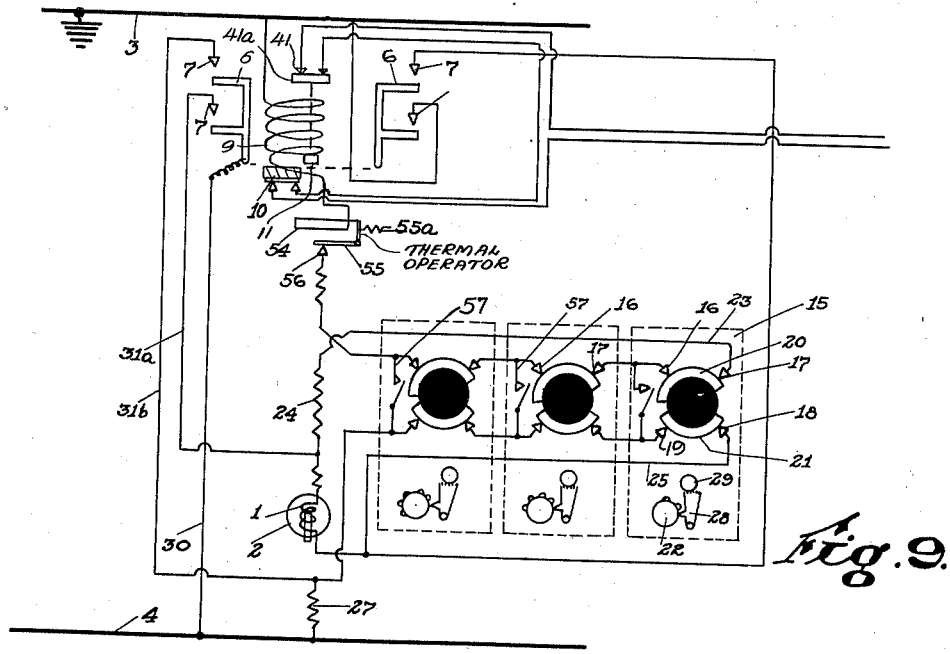
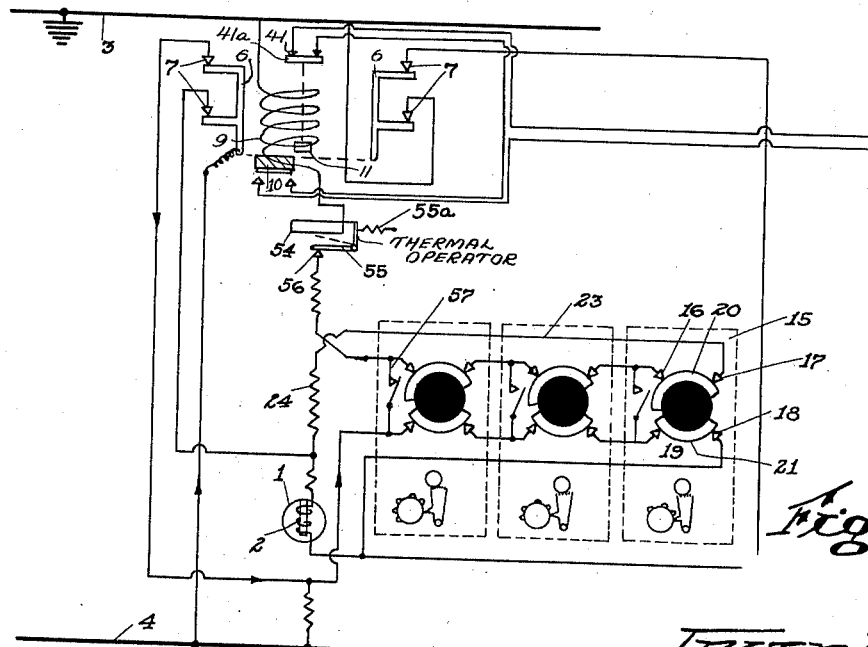

Patented Apr. 15, 1941

2,238,144

UNITED STATES PATENT OFFICE 2,238,144

ALARM SIGNAL SYSTEM

John H. Wheelock, Fitzwilliam, N. H., assignor to Signal Engineering & Manufacturing Company, New York, N. Y., a corporation of Massachusetts Application June 22, 1936, Serial No. 86,512

11 Claims. (Cl. 177—360)

The present invention relates to alarm signal systems, particularly fire alarm systems, employing a number of bells or other signals adapted to be sounded, or otherwise operated in response to the actuation of any one of a number of separate alarm sending stations, such alarm systems being commonly installed in schools, factories, hotels and other large buildings.

In the installation and operation of alarm signal systems, particularly fire alarm systems, it is necessary to have continuous electrical supervision of the various circuits and pieces of apparatus embodied in the system, so that any abnormal circuit condition, such as the occurrence of a break or ground, will be immediately called to attention by the operation of a special trouble signal, distinct from the alarm signals. Furthermore, it is most essential that the alarm signals should not be operated to give a false alarm upon the occurrence of any of the abnormal conditions that are noted above.

In my co-pending application, Serial No. 728,812, filed jointly with Frank Scherma on June 4, 1934, since issued as Patent No. 2,149,200, dated February 28, 1939, there is shown and described an alarm signal system of the above indicated type, which system is particularly characterized by the utilization of a single winding for the operation and supervision of the system, thereby greatly simplifying the system from the standpoint of installation and maintenance. The present invention relates to an alarm signal system having the same general capabilities as the system disclosed in the aforesaid copending application, and contemplates certain improvements thereon which will be hereinafter pointed out. Briefly stated, the particular objects sought to be obtained by the present invention include the complete supervision of all vital elements entering into the system, the elimination of the usual make-and-break contacts at the sending stations, the interconnection of the local system with a city system and the absolute prevention of the giving of a false alarm by the signals of the local system, or the transmission of a false alarm to the city system, upon the occurrence of any abnormal circuit conditions. The above and other advantageous features of the invention will hereinafter more fully appear from the following description with reference to the accompanying drawings, in which—

Fig. 4 is a view in front elevation showing the construction of the master circuit controlling device embodied in the system.

Fig. 5 is a view in end elevation of the device shown in Fig. 4.

Fig. 9 is a schematic view showing the system as adapted for giving a continuous alarm; Fig. 9a shows its operation.

Figs. 11, 12 and 13 are fragmentary views on an enlarged scale, illustrating the construction and operation of a code sending station.

Like reference characters refer to like parts in the different figures.

Figure 1:
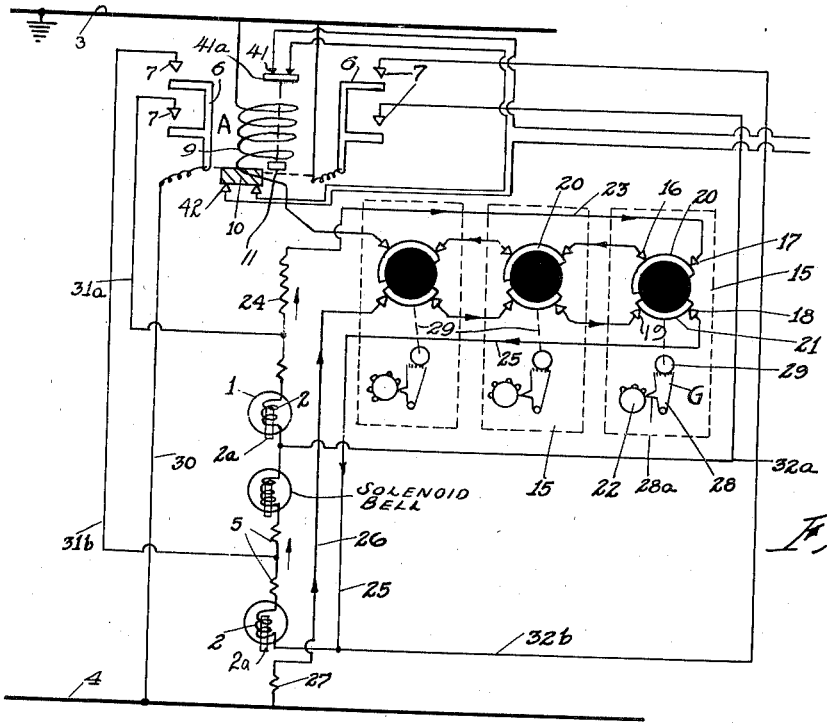
Fig. 1 is a schematic view illustrating the system in its normal condition, with continuous electrical supervision of its various circuits.

Referring first to Fig. 1, the signals 1, which are adapted to be sounded or otherwise electrically operated for giving an alarm are shown, for purposes of illustration, as being of the single-stroke solenoid type with each providing an operating winding 2 within which moves a magnetic striker 2a. The windings 2 of the signals 1 are adapted to be connected in sections across the supply mains 3 and 4, with balancing resistors 5 between the sections, by means of a number of pairs of relatively movable contacts 6 and 7 forming part of a master controller, generally designated by the reference character A.

Referring to Figs. 4 and 5, the master controller A comprises a magnetic core 8, one leg of which is surrounded by an energizing winding 9, while the lower end of the other core leg supports a main armature 10 and an auxiliary armature 11, movable independently of the main armature. The main armature 10 carries a bar 12 on which are mounted a number of contacts 6 corresponding to the movable contacts of the several sets shown in Fig. 1 for controlling energization of the signal windings 2. These contacts 6 are in the form of arms insulated from the bar 12 at 13 and cooperate with stationary contacts 7 mounted on an insulating base 14 of the master controller A. Therefore, attraction of the main armature 10, in response to energization of the winding 9, is adapted to simultaneously energize the signal windings 2, in sections, according to the connection of the several pairs of contacts 6 and 7 to the signal windings 2 and to the supply mains 3 and 4.

Referring again to Fig. 1, the winding 9 of the master controller A is shown as having one terminal thereof connected to the supply main 3, while the other terminal thereof is connected in series with a number of alarm sending stations 15, disposed in various locations throughout the system. Each sending station provides a suitable contacting mechanism, here shown as comprising independent pairs of spaced stationary contacts 16, 17 and 18, 19, and in the normal, non-operating condition of the station, a circuit is maintained between contacts 16 and 17 by a bridging member 20, while a second bridging member 21 maintains a circuit between contacts 18 and 19.

Figure 2:
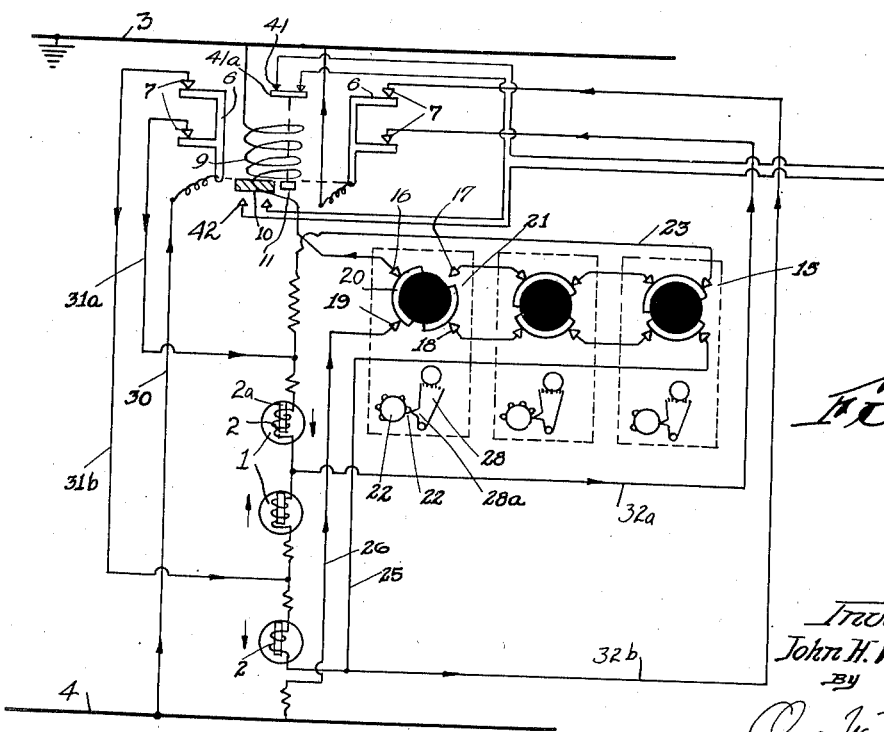
Fig. 2 is a schematic view similar to Fig. 1, illustrating the sending of the first impulse of an alarm upon actuation of one of the alarm sending stations.

The bridging members 20 and 21 are insulated from each other and in the operation of a station 15 are turnable in unison from the position of Fig. 1 to the position of Fig. 2, so as to establish a circuit between the station contacts 16 and 19 for a purpose which will shortly appear. The showing of the stations 15 is entirely diagrammatic in Fig. 1 and a station of this character is more fully shown in Fig. 11, wherein a code wheel 22 is adapted to be rotatably driven by a suitable clockwork mechanism upon actuation of the station.

In the normal non-operating condition of the system shown in Fig. 1, all of the contacts 16 and 17 of the several stations 15 are connected in series with the controller winding 9 through the bridging members 20, and the contact 17 of the station farthest removd from the winding 9 in the circuit, is connected by a station conductor 23 to a controlling resistor 24. The resistor 24 is in turn connected in series with the signal windings 2 and balancing resistors 5, and the last signal winding 2 is connected to the farthest station contact 18 through a station conductor 25. The circuit extends through the bridged contacts 18 and 19 of the several stations, and a conductor 26 connects the nearest station contact 19 to the main 4 through a current-limiting resistor 27. Normally, a small supervisory current traverses the parts of the system described thus far, as follows:—

Beginning at the supply main 4, the supervisory current flows through the resistor 27, bridged station contacts 19 and 18, and through the station conductor 25 to the windings 2 and resistors 5 of the several sections of signals 1. The current then passes through the controlling resistor 24 and station conductor 23 to the other series of bridged station contacts 17 and 16, and from thence through the winding 9 of the master controller A to the grounded supply main 3. The value of this supervisory current is such as to energize the winding 9 just enough to attract and hold up the auxiliary armature 11 while the main armature 10 remains down; therefore, the system remains in supervised condition, in readiness either for (a) the operation of the alarm signals, upon actuation of a sending section, or (b) indication of a fault or any abnormal circuit condition by a trouble signal, without operation of the alarm signals.

*Operation of alarm signals*

Whenever any one of the stations 15 is actuated for the purpose of sending an alarm, rotation of the code wheel 22 causes the first code projection 22a, acting through an operating lever 28 and gearing G, to turn a shaft 29, which carries the bridging members 20 and 21 through a predetermined angle, as shown in Figs. 2 and 12. When this occurs, the contacts 16 and 19 are connected together at the actuated station, while contact 17 is entirely disconnected. Obviously, other contact arrangements may be employed for the same purpose, namely, to establish a circuit from the supply main 4 through conductor 26, and closed station contacts, directly to the controller winding 9, so that the controlling resistor 24, the signal windings 2 and resistors 5, are no longer in circuit with the winding 9. The resulting increase of current through the winding 9 then pulls up the main armature and causes closure of all the controller contacts 6 and 7.

This increased flow of current through the winding 9 has no immediate effect on the signals 1, which are then out of circuit with the controller winding, but upon closure of the controller contacts 6 and 7, a number of signal energizing circuits are established. Starting from the supply main 4, current flows through a conductor 30 leading to the closed contacts 6 and 7 at the left of the winding 9 and from these contacts 7 signal operating current may then follow parallel paths through conductors 31a and 31b, leading to the several sections of signals 1. After traversing the signal windings 2, the operating current then flows through conductors 32a and 32b to the closed controller contacts 6 and 7 at the right of the winding 9, and from thence to the grounded supply main 3. This causes the signals to give the first impulse of the code being transmitted by the actuated station 15.

The main armature 10 remains up until a tooth 28a on the lever 28 enters the space between the first and second code wheel projections 22a, thereby turning the shaft 29 through only about one half its original displacement of 45°, and returning the bridging members 20 and 21 to the intermediate position of Fig. 13. This movement breaks the circuit between station contacts 16 and 19 to deenergize the controller winding 9, followed by opening of the controller contacts, as the main armature drops to restore the signal windings 2 to deenergized condition, but it does not reinsert the resistor 24 in the circuit of winding 9. This cycle of operation is repeated for each projection 22a of the code wheel 22, thereby causing the signals 1 to give spaced code impulses, in accordance with the arrangement of the projections 22a on the code wheel. After the code wheel 22 has made one or more revolutions to transmit the desired number of rounds of signal impulses, the wheel 22 comes to rest, with the lever 28 in the position of Fig. 11, wherein the station contacts 16, 17 and 18, 19 are again bridged. Thus, the circuit is restored to a condition of supervision, in readiness to indicate any abnormal circuit condition, through the operation of a trouble signal, as will be hereinafter described.

In the operation of a station 15, it is to be noted that when once the resistor 24, signal windings 2 and resistors 5 have been cut out of the circuit of the controller winding 9 by unbridging the contacts 16 and 17, these resistances remain out of circuit during the entire operation of the actuated station. This prevents the actuation of any station farther removed from the controller winding 9 than the first actuated station, from interfering with the code being transmitted. Furthermore, the fact that a direct circuit from the supply main 4 is established through the conductor 26 to the controller winding 9, upon bridging of the contacts 16 and 19 at a station, absolutely prevents any fault which might occur in a signal circuit from interfering with the operation of the station, or operation of the remaining signals. This is because the energizing circuit of the controller winding 9, as controlled through any one of the stations 15, is entirely independent of the signal circuits, which in turn may be energized independently of each other, due to the connection of different signal sections to different controller contacts 7. Furthermore, a fault in a station 15 farther removed from the winding 9 than the station that has been actuated, will not interfere with the transmission of the signals by the nearer station, although any fault in the system will be immediately indicated through operation of a trouble signal, as will next be described.

*Indication of abnormal circuit condition*

Figure 3:
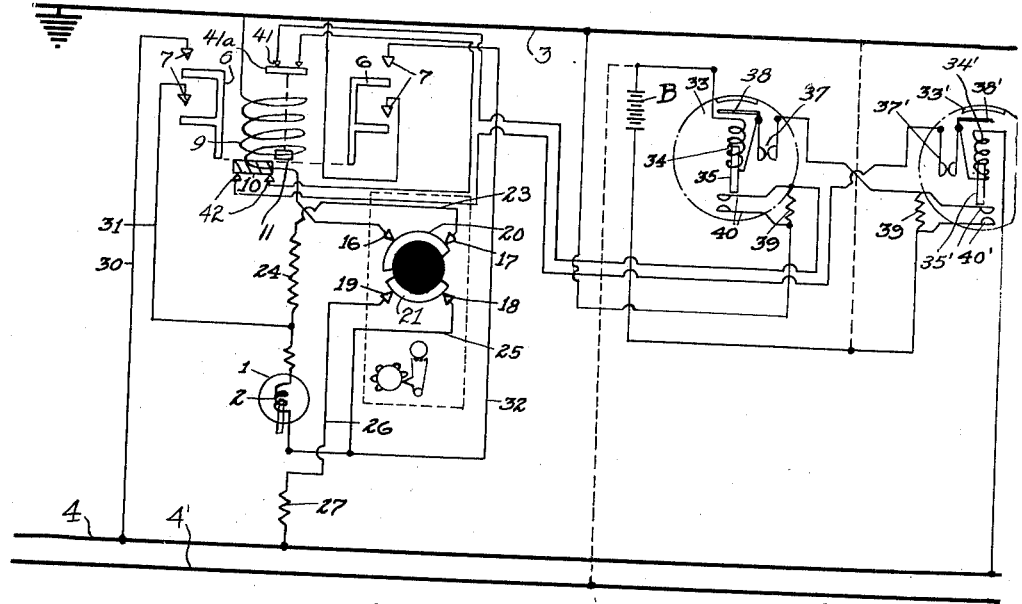
Fig. 3 is a schematic view, illustrating the functioning of the trouble signal for indicating an abnormal circuit condition.

Referring now to Fig. 3, there is shown an extension of the basic circuit of Fig. 1, to include the previously mentioned trouble signal, as well as an arrangement for supervision of the trouble signal itself, the showing of the trouble signal being omitted from Figs. 1 and 2 for the sake of simplicity. The main trouble signal 33 provides a solenoid 34 within which operates a magnetic plunger 35 adapted to strike a resonant member 36 in response to full energization of the solenoid 34, one terminal of which is connected to one side of a separate power source, such as battery B, or the supply main 4'. The other terminal of solenoid 34 is connected through the normally closed contacts 37 of an interrupter, providing a lever 38 operable when the plunger 35 moves to striking position, and also through a resistor 39 to the other side of source B, or the grounded supply main 3. Resistor 39 limits the current in the solenoid 34 to such a low value that the plunger 35 is maintained slightly raised from its lowermost position just out of engagement with normally open supervisory contacts 40.

An auxiliary trouble signal 33', constructed in the same manner as the trouble signal 33, has one terminal of its solenoid 34' connected to the supply main 4, its other terminal being connected in series with interrupter contacts 37', normally closed pairs of trouble contacts 41 and 42 and a resistor 39' shunted across the open supervisory contacts 40. The farther side of the resistor 39' is connected to the grounded supply main 3, so that normally there is a small supervisory current flowing through the solenoid 34' of the signal 33'. With supervisory current flowing in solenoid 34', the plunger 35' is maintained slightly above its lowermost position just out of engagement with normally open contacts 40' connected across the resistor 39 that is in circuit with the solenoid 34.

As best shown in Fig. 4, the trouble contacts 41 are mounted on the base 14 of the master controller A, and these contacts 41 are normally bridged by a member 41a mounted on a rod R connected to the free end of the auxiliary armature 11. Additional trouble contacts 42 are held closed by a member 42a mounted on the armature 10, which member 42a engages contacts 42, with the armature 10 in its lower position. Thus while supervisory current flows through the controller winding 9, the contacts 41 and 42 will be closed to maintain the circuit of the solenoid 34'.

Upon the occurrence of a break or a ground in the circuit of the signals 1 and sending stations 15, the auxiliary armature 11 will fall, thereby opening the trouble contacts 41, to cause operation of the trouble signal 33. Furthermore, if for any reason armature 10 remains up, opening of contacts 42 will also cause operation of trouble signal 33.

Upon opening of the trouble contacts 41 or 42, the flow of supervisory current through the solenoid 34' is interrupted, thereby permitting the plunger 35' to drop. This causes the contacts 40' to short circuit the resistor 39 and thereby fully energize the solenoid 34, whereupon the plunger 35 strikes the resonant member 36 a single stroke. The plunger will give recurring strokes as long as the contacts 40' remain closed, due to the operation of the interrupter contacts 37 by the lever 38. The main trouble signal 33 will therefore continue to operate and indicate the existence of an abnormal condition in the system until the cause of the trouble is remedied and the armature 11 drawn up, or armature 10 released, upon reestablishment of the main supervisory circuit of the system.

If there should occur a break in the circuit of the main trouble signal 33, or a ground, where a grounded source is used, or should the source B fail, the resulting deenergization of the solenoid 34 will cause the plunger 35 to fall to its lowermost position, thereby closing the contacts 40 to short circuit the resistor 39' in circuit with the solenoid 34'. When this occurs, the auxiliary trouble signal 33' will operate until the source of trouble is removed. Furthermore, a break in the circuit of the auxiliary trouble signal 33', or failure of mains 3 and 4 will have the same effect as opening the trouble contacts 41, thereby short circuiting the resistor 39 and causing the main trouble signal 33 to operate. There is thus provided double or cross supervision of the trouble signal circuits, all as more fully set forth in a division of the present application, Serial No. 321,323, filed February 28, 1940.

As previously pointed out, the system of the present invention is characterized by the fact that the alarm signals 1 cannot operate upon the occurrence of an abnormal circuit condition, such as a break or ground. This is due to the fact that the signals 1 can only be energized upon closure of the controller contacts 6 and 7 and, obviously, the main armature 10 cannot pull up upon the occurrence of a break or ground in the signal and station circuits. Upon the occurrence of a ground in these circuits, the presence of the resistor 27 limits the current flowing through any of the windings 2 to such a low value as to prevent operation of the signals, it being evident that closure of the main controller contacts 6 and 7 is the only way in which sufficient current can flow through the signals to operate them. Therefore, by the present invention there is provided a completely supervised signal system, and the manner in which this system may be extended without substantial change, to operate in conjunction with a city fire alarm box or to transmit pre-signals, as well as to include other features, will next be described.

*Connection with city fire alarm*

Figure 6:
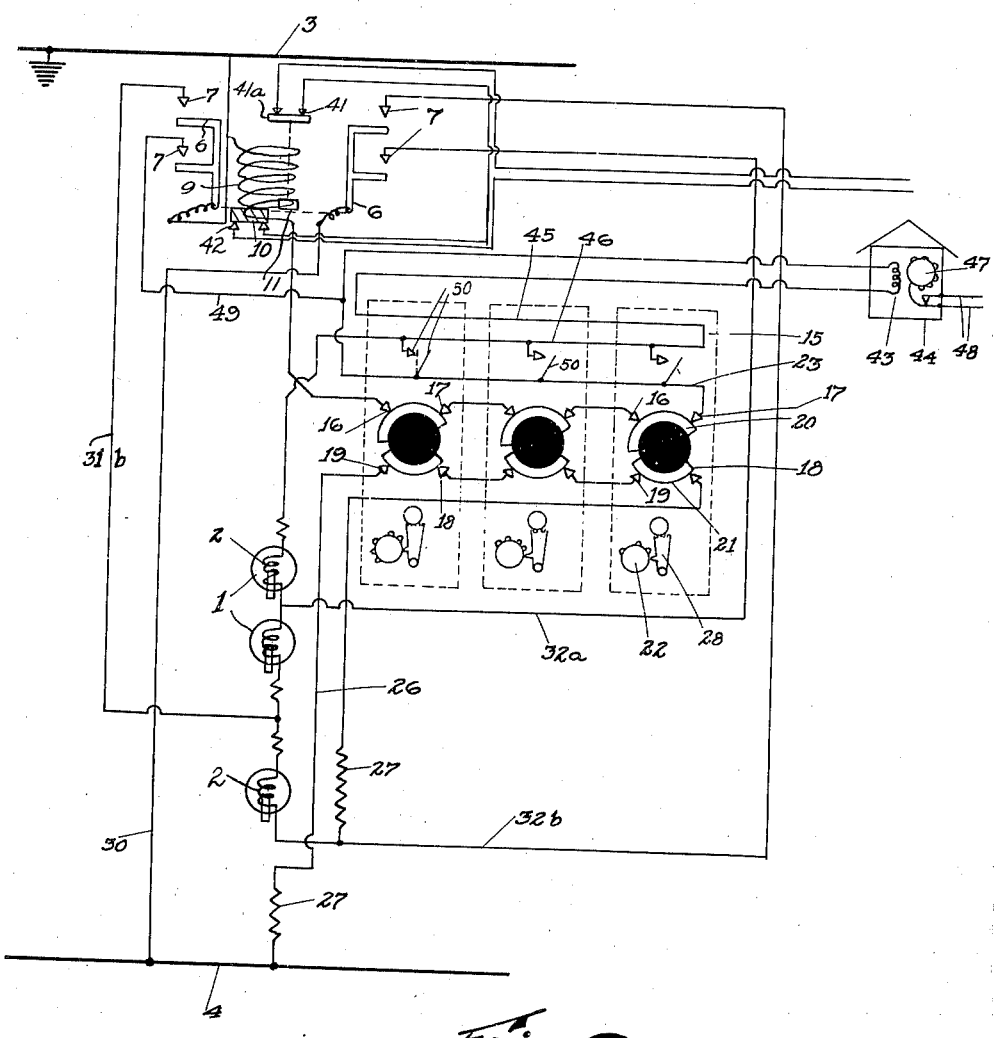
Fig. 6 is a schematic view similar to Fig. 1, illustrating connection of the system with a city fire alarm box.

Referring to Fig. 6, there is shown a system similar to Fig. 1, with provision of means for transmitting the alarm to the box of a city fire alarm system, upon actuation of any one of the stations 15. To this end, one terminal of the trip coil 43 of a city box 44 is connected by station conductors 45 and 46 to the signal windings 2, while the other terminal thereof is connected by the station conductor 23 to the bridged station contacts 17 and 16. Energization of the trip coil 43 is adapted to release the signal-transmitting wheel 47 of the box 44, which wheel 47 cooperates in the usual manner with contacts connected to wires 48 leading to the central station of the fire department. Thus, energization of the trip coil 43 will have the same effect as if the city box had been manually operated to release the wheel 47, to thereby transmit a series of signal impulses to the city fire department through the wires 48, in accordance with the code designation of the box 44.

In the normal non-operating condition of the system, supervisory current flows from the main 4 through conductor 26, bridged station contacts 19 and 18, and then through the controlling resistor 24 to the signal windings 2. From the windings 2, supervisory current transverses station conductors 46 and 45 leading to the box trip coil 43, and from coil 43 flows through station conductor 23, bridged station contacts 17 and 16, to the controller winding 9 and grounded main 3. In this way, the trip coil 43 of the city box is included in the general supervisory circuit of the system.

Upon actuation of a sending station 15, bridging of station contacts 19 and 16 will cause the winding 9 to be fully energized, in the same manner as previously described with reference to Fig. 2. The resulting closure of controller contacts 6 and 7 will thereupon cause a circuit to be established from the lower left hand contact 7 through a conductor 49 to one terminal of the trip coil 43. Therefore, signal energizing current will flow from the trip coil 43 through the box conductors 45 and 46 to the first section of signal windings 2, and from thence through the conductor 32a and the closed right-hand controller contacts 6 and 7 to the supply main 4. Consequently, the actuation of any station 15 will result in energization of the trip coil 43, in unison with one section of signal windings 2, so that an alarm will be sent in from the city box to the central station of the fire department, upon release of the transmitting wheel 47.

In order to prevent operation of the city box 44, as when testing the system, or operating it for the purpose of a fire drill, each station 15 provides relatively movable contacts 50 connected between the station conductors 23 and 46. These contacts 50 are normally open at each station, but should the contacts be closed, prior to the actuation of a station, it would have the effect of short circuiting the trip coil 43 at that particular station, and thereby prevent the city box from being operated. Assuming that the contacts 50 at a given station have been closed, as indicated in dotted lines, it is evident that closure of the controller contacts, upon the first pull up of the armature 10, will establish a circuit through the conductors 49 and 23, direct to the box conductor 46 leading to the first section of signal windings 2. In this way, the city box trip coil 43 is shunted out as long as the contacts 50 remain closed. After a station 15 has been actuated, for purposes of test or a fire drill, the contacts 50 are opened to restore the system to its normal condition of supervision.

In the foregoing discussion of the operation of the system, all the signals I have been described as being operated in response to the actuation of a sending station, in order to give a general alarm throughout the entire system. In certain signal installations, however, it is desirable to sound only certain predetermined signals, hereinafter termed pre-signals, in order to enable persons in authority to decide whether or not the situation warrants the sounding of a fire alarm throughout the entire system, and the present invention contemplates the adaptation of the system for the sounding of both pre-signal and general alarms, as will next be described.

*Pre-signal and general alarm system*

Figure 7:
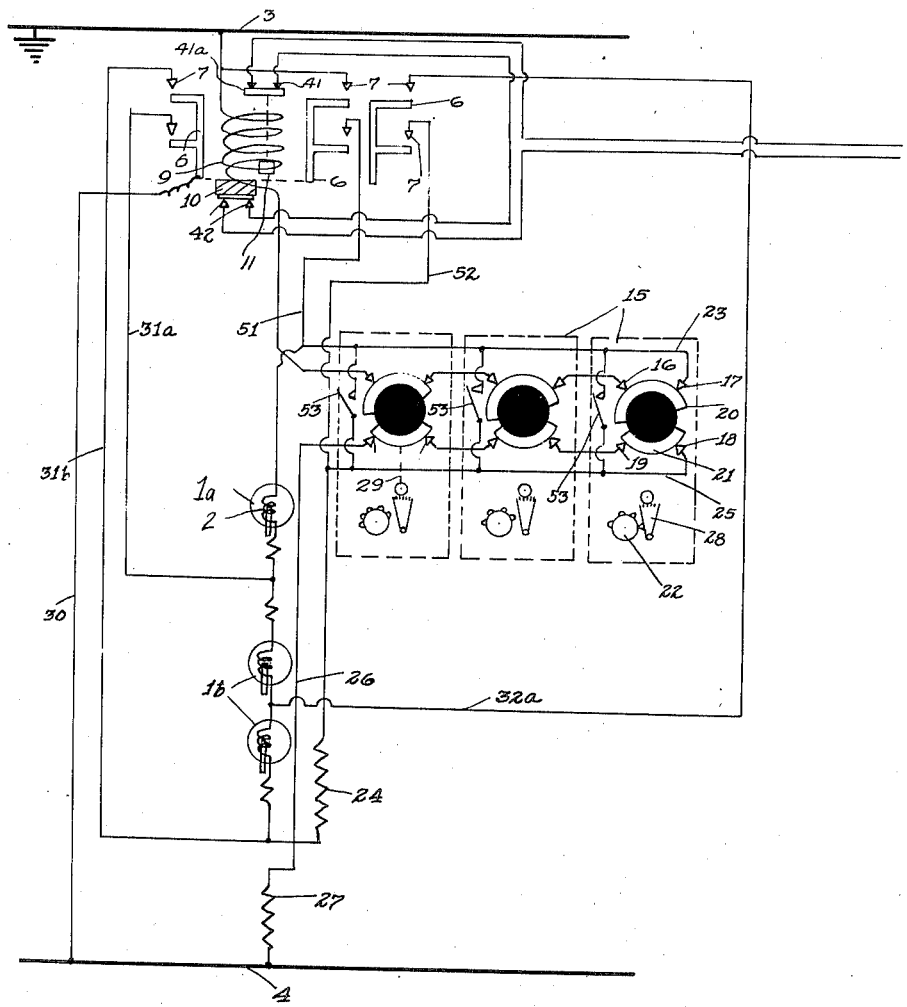
Figs. 7 and 8 are schematic views, illustrating the invention embodied in a pre-signal and general alarm system.

Referring now to Fig. 7, the pre-signals 1a are connected to a point between station conductor 23 and a conductor 51 leading to one lower right hand controller contact 7. The general alarm signals 1b are connected through resistor 24 to a point between station conductor 25 and a conductor 52 leading to the other lower right hand controller contact 7. Furthermore, each station 15 provides normally open contacts 53, connected between the station conductors 23 and 25, and these contacts 53 are adapted to be manually closed from a readily accessible point on the outside of a sending station box, for a purpose which will shortly appear.

With the station contacts 53 open, supervisory current flows from the supply main 4 through conductor 26, bridged station contacts 19 and 18, conductor 25 and resistor 24 to the lower section of general alarm signals 1b. From here, the supervisory current traverses the next section of general alarm signals 1b and pre-signals 1a, from which the course of the supervisory circuit is through station conductor 23, bridged contacts 17 and 16 and the controller winding 9 to the grounded main 3. The system is thus completely supervised, with fault indicating contacts 41 and 42 functioning as previously described with reference to Fig. 3.

Upon the operation of a sending station 15, the first closure of the controller contacts 6 and 7 results in establishing a circuit from supply main 4 through conductors 30 and 31a to the pre-signals 1a, and from thence through conductor 51 to the first right-hand controller contacts 6 and 7 and supply main 3. Therefore, signal operating current flows only through the pre-signals 1a, the general alarm signals 1b, at that time being connected only to the supply main 4 through conductors 31a and 31b, with no current flowing through conductor 32a. Upon the sounding of the pre-signals 1a at various points in the system, in accordance with the code designation of the actuated station, certain persons in authority are supposed to go to the station and there decide whether or not to send in a general alarm.

Should it be decided to give a general alarm, the contacts 53 at the actuated, or any other, station are closed manually, and the station is rewound to transmit an additional cycle of signals. Then, when the controller contacts close again, current from both sections of general alarm signals 1b flows through conductors 32a and 52 leading to the station conductor 25. The current then flows through the closed contacts 53 at the actuated station to station conductor 23 and conductor 51 leading to the supply main 3. The signal operating current traversing the pre-signals 1a and one section of general alarm signals 1b, flows from the main 4 by conductor 31a, while current for the other section of signals 1b traverses conductor 31b, thus energizing all signals. After the sounding of a general alarm, the contacts 53 at the actuated box are opened, to restore the system to a condition of supervision.

Figure 8:
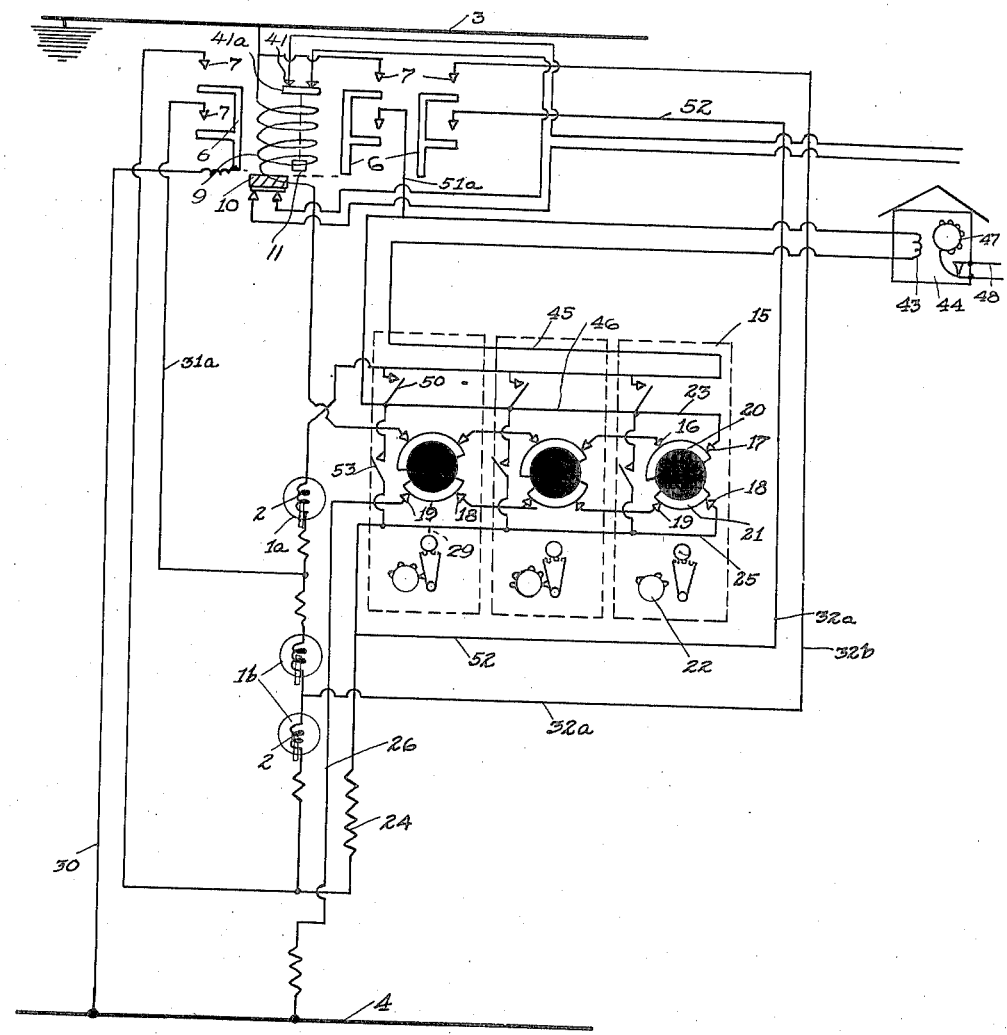

In Fig. 8, the system is shown as incorporating the trip coil 43 of a city box 44, in connection with pre-signals 1a and general alarm signals 1b. In this arrangement, each station 15 provides station conductors 23, 25, 45 and 46, connected as previously described with reference to Fig. 6, with all elements included in a supervisory circuit, as follows:

From supply main 4, the supervisory current traverses conductor 26, bridged station contacts 19 and 18, conductor 25, controlling resistor 24 and the two sections of general alarm signals 1b. From there, the current passes through the pre-signals 1a, and the station conductors 46 and 45 which lead the supervisory current to the city box trip coil 43 and back through conductor 23, the bridged contacts 17 and 16 and controller winding 9 to the grounded supply main 3.

Each station 15 provides pairs of relatively movable contacts 50 and 53, so that the station conductor 23 can be connected to either station conductor 46 or 25. Normally, the contacts 50 and 53 are open, so that upon actuation of a station 15, and closure of the controller contacts, operating current for the pre-signals 1a traverses conductors 30, 31a, pre-signal winding 2, station conductors 46 and 45, trip coil 43 and conductor 51a. Thus, the city box will be operated in unison with the pre-signals 1a, with the general alarm signals 1b being maintained out of circuit, as previously described with reference to Fig. 7. The trip coil 43 can be short circuited at any station 15 by closure of the contacts 50, and the general alarm signals 1b can be caused to operate in unison with the pre-signals 1a by closure of the contacts 53 at any station. Signal operating current then flows through conductors 32a, 52 and 51a to main 3, as presently described.

In all of the systems described thus far, the actuation of a station 15 is adapted to selectively operate the signals through a pre-determined number of code sequences determined by the construction of the operating mechanism of the station, after which the signals cease to operate, unless a station is again actuated. In Fig. 9, the system is shown as being adapted to intermittently operate the signals, although not in accordance with a code, after the actuated station has run down. In this way, the actuation of a station will insure not only the transmission of a code to indicate the location of the fire, but also the continued operation of the signals to insure that all persons will be warned that an alarm has been sent.

In Fig. 9, one terminal of the controller winding 9 is shown as connected to one end of the thermal element 54 of an automatic circuit interrupter, of the type shown in Hanel Patent No. 1,868,500, issued July 26, 1932. The interrupter is shown diagrammatically, as consisting of a pivoted arm 55, connected to the other end of the thermal element 54, with the initial tension of element 54 maintaining the arm 55 in engagement with a stationary contact 56. Upon the passage of a predetermined current through the element 54, its heating and expansion permits a spring 55a to turn the arm 55 about its pivot to disengage stationary contact 56, whereupon current no longer flows through element 54. The resulting cooling and contraction of the element 54 causes the arm 55 to reengage contact 56, whereupon the cycle is repeated to cause the interrupter to make and break the circuit of the element 54 so long as sufficient current flows through the element to cause its expansion.

The stationary contact 56 of the interrupter is connected to the bridged station contacts 16 and 17, from which the circuit extends through station conductor 23, resistor 24, signal windings 2 and conductor 25, through the bridged station contacts 18 and 19 and conductor 26 to supply main 4. Obviously, the supervisory circuit of Fig. 9 is substantially the same as in Fig. 1, with the exception that only one section of signals is shown, and that the contact 56 and thermal element 54 are included in the supervisory circuit.

Each station 15 provides a pair of normally open contacts 57 connected between station contacts 16 and 19. These contacts 57 remain open during the transmission of signal impulses by an actuated station 15, and after the station has run down, are closed, either manually or automatically, as desired. While the contacts 57 at a station remain open, the actuation of the station results in the operation of the signals 1, in accordance with the code of the actuated station, in the same manner as previously described, with reference to Figs. 1 and 2. During such coded operation of the signals, the successive energizations of the controller winding 9, by full operating current, are not of sufficient duration to have any effect on the thermal element 54, so that the circuit remains closed at the interrupter contact 56.

However, upon closure of the station contacts 57 and pull up of the armature 10 after the actuated station has come to rest, as shown in Fig. 9a, a direct circuit is provided through conductors 30 and 31b for the flow of operating current through the thermal element 54, in series with the winding 9, as indicated by arrows. When this occurs, expansion of the element 54 permits the spring 55a to turn the arm 55, and so open the circuit of the winding 9 at the contact 56. The main armature 10 thereupon drops, but is pulled up again when the arm 55 reengages contact 56, upon cooling of the thermal element 54. Therefore, the signals 1 will continue to operate intermittently, although without code sequence, as long as the contacts 57 at a station 15 remain closed. Upon restoration of the actuated station to normal condition, as by replacing the glass in the box, the contacts 57 are opened, thereby silencing the signals and restoring the system to a condition of supervision.

Figure 10:
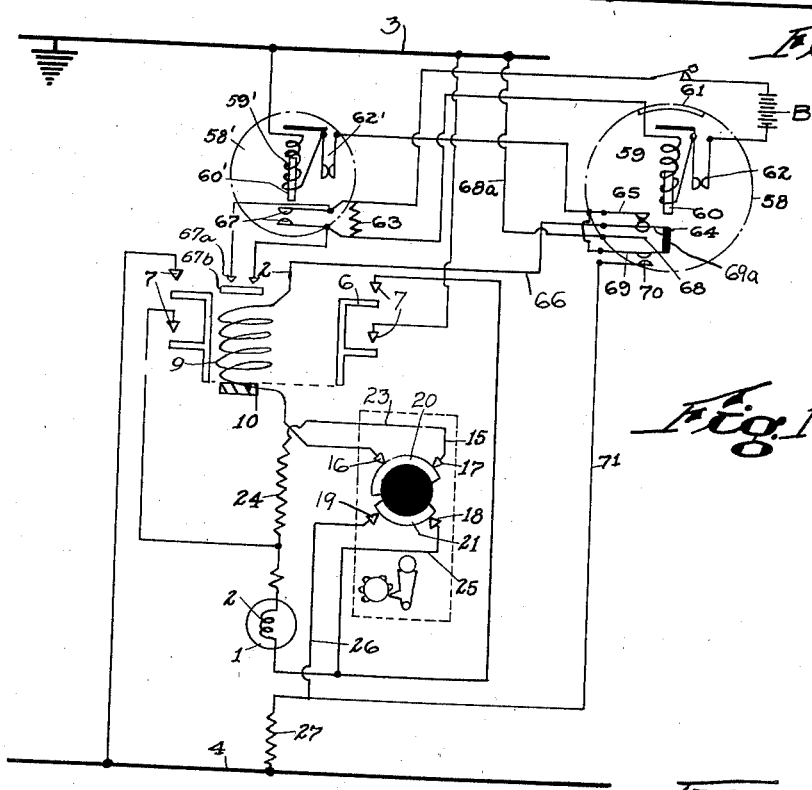
Fig. 10 is a schematic view similar to Fig. 3, illustrating a modification in the supervision and functioning of the trouble signals.

Referring now to Fig. 10, there is shown a modified arrangement of the system of Fig. 3, whereby operation and double supervision of the trouble signals are obtained without the use of the auxiliary armature 11, under the control of the winding 9. In this modified arrangement, a main trouble signal 58 provides a solenoid 59, within which operates a magnetic plunger 60, adapted to strike a resonant member 61, in response to full energization of the solenoid 59. One terminal of the solenoid 59 is connected to one side of a separate power source, such as a battery B, through the normally closed contacts 62 of an interrupter, operable when the plunger 60 moves to striking position. The other terminal of the solenoid 59 is connected through a resistor 63, to the other side of source B, the resistor 63 limiting the current in the solenoid 59 to such a low value that the plunger 60 is maintained slightly raised from its lowermost position, just out of engagement with a flexible contact 64.

An auxiliary trouble signal 58′, constructed in the same manner as the trouble signal 58, has one terminal of its solenoid 59' connected to the grounded supply main 3, while its other terminal is connected through closed interrupter contacts 62' to stationary contact 65, normally engaged with contact 64 of the primary trouble signal 58. The contact 64 is connected by a conductor 66 to the winding 9 of the master controller A, so that the solenoid 59' of the auxiliary trouble signal 58' is included in the main supervisory circuit of the system, the other parts of which are arranged exactly as previously shown and described, with reference to Fig. 3.

With the supervisory current of the system flowing through the solenoid 59', the plunger 60' of the trouble signal 58' is maintained slightly raised from its lowermost position, just out of engagement with normally open contacts 67 connected across the terminals of the resistor 63 that is in circuit with the solenoid 59 of the trouble signal 58. Therefore, upon the occurrence of a break or ground in the circuits of the signals 1, sending stations 15, or the trouble signal winding 59', the interruption of supervisory current through the solenoid 59' causes the plunger 60' to drop to its lowermost position, and thereby close the contacts 67. This causes the resistor 63 to be short circuited, and fully energizes the solenoid 59 whereupon the plunger 60 strikes the resonant member 61 a single stroke. The plunger 60 will give recurring strokes as long as the contacts 67 remain closed, due to the operation of the interrupter contacts 62, so that the trouble signal 58 will continue to indicate the existence of an abnormal circuit condition until the cause of the trouble is remedied and the supervisory circuit re-established. Not until then will the plunger 60' be partially raised from its lowermost position to permit opening of contacts 67.

If at any time there should occur a break or ground, where a grounded source is used, in the circuit of the primary trouble signal 58, or should the source B fail, the resulting deenergization of the solenoid 59 will permit the plunger 60 to fall to its lowermost position, thereby moving contact 64 out of engagement with contact 65 and into engagement with a stationary contact 68. When this occurs, the conductor 66 leading from the controller winding 9, is connected directly to the grounded main 3 through contact 68 and its conductor 68a, thereby maintaining the main supervisory circuit of the system, independently of the solenoid 59' of the auxiliary trouble signal 58'. Movement of the contact 64 to engage the contact 68 is accompanied by movement of a contact 69, which is mechanically connected to contact 64 by an insulating block 69a. The contact 69 is electrically connected to the contact 65, and its movement by the plunger 60 carries it into engagement with a stationary contact 70, connected to the supply main 4 through a conductor 71 and resistor 27. Closure of the contacts 69 and 70, therefore, connects the solenoid 59' across the supply mains 3 and 4 to cause operation of the auxiliary trouble signal 58'. This indicates either trouble in the primary trouble signal circuit, or failure of the source B, so that both trouble signals 58 and 58' are under constant supervision. In case the armature 10 remains up due to the winding 9 remaining fully energized, a pair of normally open contacts 67a will be bridged by a member 67b carried by the armature 10 to shut out the resistor 63 and operate the signal 58, as more fully set forth in my aforesaid divisional application, Serial No. 321,323.

In all of the systems illustrated herein, a master controller having a single winding is adapted to close the several signal operating circuits, in response to an increase in the current flowing through the winding, upon the operation of a sending station. In all forms of the system, the increase of current through the master controller winding is caused by cutting out a resistance normally included in the supervisory circuit of the station contacts, which contacts are operated by the shifting of bridging members, with the substantial elimination of wear and arcing. In the operation of the system in its several phases, there is no possibility of the alarm signals being sounded upon the occurrence of a break or ground, due to the fact that full energization of the master controller winding is required in order to close the normally open signal energizing circuits.

I claim:

1. In an electric signaling system, the combination with transmitting stations including contacts with connections therebetween movable upon actuation of a station, signals, a resistance between said contacts and signals, a controller having a winding in a closed supervisory circuit including said station contacts, signals and resistance, and signal energizing circuits including normally open contacts operable by said controller, with the flow of supervisory current through said controller winding being insufficient to cause closure of its contacts, or to operate said signals, of means responsive to movement of the contact connections of an actuated station for removing said resistance and signals from the supervisory circuit to fully energize said controller winding and cause its contacts to close said signal circuits.

2. In an electric signaling system, the combination with transmitting stations including contacts with connections therebetween movable upon actuation of a station, signals, a resistance between said contacts and signals, a controller having a winding in a closed supervisory circuit including said station contacts, signals and resistance, and signal energizing circuits including normally open contacts operable by said controller, with the flow of supervisory current through said controller winding being insufficient to cause closure of its contacts, or to operate said signals, of means responsive to movement of the contact connections at an actuated station for removing said resistance and signals from the supervisory circuit, whereby to increase the current traversing said controller winding and cause said controller contacts to close said signal circuits, said resistance remaining out of said controller winding circuit during the entire operation of the actuated station.

3. In an electric signaling system, the combination with transmitting stations including contacts with connections therebetween movable upon actuation of a station, signals, a trip coil for an outside sending station and a resistance both between said contacts and signals, a controller having a winding in a closed supervisory circuit including said station contacts, signals, trip coil and resistance, and signal energizing circuits including normally open contacts operable by said controller, with the flow of supervisory current through said controller winding being insufficient to cause closure of its contacts, or to energize said signals and trip coil, of means responsive to the movement of the contact connections at any one of said stations to remove said resistance, signals and trip coil from the supervisory circuit to increase the energization of said controller winding and cause the closure of said signal operating circuits, and the energization of said trip coil.

4. In an electric signaling system, the combination with transmitting stations including contacts with connections therebetween movable upon actuation of a station, signals, a resistance, a controller having a winding in a closed supervisory circuit including said station contacts, signals and resistance, and signal energizing circuits including normally open contacts operable by said controller, with the flow of supervisory current through said controller winding being insufficient to cause closure of its contacts, or to operate said signals, of means responsive to actuation of any station to cause its contact connections to interrupt said supervisory circuit and to establish a new circuit through said controller winding, excluding said resistance and signals, whereby to increase the energization of said winding and cause its contacts to close said signal operating circuits.

5. In an electric signaling system, the combination with transmitting stations including contacts with connections therebetween movable upon actuation of a station, pre-signals, general alarm signals, a resistance, a controller having a winding in a closed supervisory circuit including said station contacts, signals and resistance, and energizing circuits for said signals including normally open contacts operable by said controller, with the flow of supervisory current through said controller winding being insufficient to cause closure of its contacts, or to operate said signals, of means responsive to the initial actuation of the contact connections at any station for removing said resistance and all of said signals from said supervisory circuit to fully energize said controller winding and cause its contacts to complete only the circuits of said pre-signals and conductors extending through all of said stations and included in said supervisory circuit for establishing a closed circuit at any station to cause completion of the circuits of said general alarm signals simultaneously with said pre-signals.

6. In an electric signaling system, the combination with transmitting stations including contacts with connections therebetween movable upon actuation of a station, pre-signals, general alarm signals, a trip coil for an outside sending station, a resistance, a controller having a winding in a closed supervisory circuit including said station contacts, signals, trip coil and resistance, and signal energizing circuits including normally open contacts operable by said controller, with the flow of supervisory current through said controller winding being insufficient to cause closure of its contacts, or to energize said signals and trip coil, of means responsive to actuation of the contact connections of a station for removing said resistance, all said signals and trip coil from said supervisory circuit to fully energize said controller winding and cause closure of its contacts to energize only said pre-signals and trip coil, and conductors extending through all of said stations and included in the supervisory circuit for establishing a closed circuit at any station and causing energization of said general alarm signals simultaneously with said pre-signals, and independently of said trip coil.

7. In an electric signaling system, the combination with transmitting stations including contacts with connections therebetween movable upon actuation of a station, pre-signals, general alarm signals, a trip coil for an outside sending station, a resistance, a controller having a winding in a closed supervisory circuit including said station contacts, signals, trip coil and resistance, and signal energizing circuits including normally open contacts operable by said controller, with the flow of supervisory current through said controller winding being insufficient to cause closure of its contacts, or to energize said signals and trip coil, of means responsive to actuation of the contact connections of a station for removing said resistance, all said signals and trip coil from said supervisory circuit to fully energize said controller winding and cause closure of its contacts to energize only said pre-signals, and conductors extending through all of said stations and included in the supervisory circuit for establishing a closed circuit at any station and selectively causing energization of either said trip coil or said general alarm signals with said pre-signals.

8. In a system for sending electrical impulses to receiving devices, a source of electrical energy, sending stations each comprising contacts and relatively movable bridging members cooperating therewith, a resistance connected in circuit with said station contacts and bridging members to restrict the flow of current from said source to a small supervisory value in the non-operating condition of said stations, and means at each station for causing relative movement between said contacts and bridging members with the relation between said contacts and bridging members being such as to cause the removal of said resistance from the station circuit during the operation of a station.

9. In an electric signaling system, the combination with transmitting stations, each including contacts, with connections therebetween, and means for repeatedly changing said contact connections in accordance with a predetermined code sequence upon actuation of the station, signals, a resistance normally included by said station contacts and connections in circuit with said signals, a controller having a winding in a closed supervisory circuit including said station contacts and connections, signals and said resistance and signal energizing circuits including normally open contacts operable by said controller, with the flow of supervisory current through said controller winding being insufficient to cause closure of its contacts, or to operate said signals, of means responsive to successive changings of the connections between the contacts of an actuated station for removing said resistance and signals from the supervisory circuit to fully energize said controller winding and cause its contacts to successively close said signal circuits in accordance with the code sequence of the actuated station.

10. In an electric signaling system, the combination with transmitting stations each including contacts with connections therebetween, and means for repeatedly changing said contact connections upon the actuation of a station in accordance with a code sequence, signals, a resistance between said station contacts and signals, a controller having a winding in a closed supervisory circuit including said station contacts, signals and resistance, and signal energizing circuits including normally open contacts operable by said controller, with the flow of supervisory current through said controller winding being insufficient to cause closure of its contacts, or to operate said signals, of a device for transmitting current impulses intermittently included in said supervisory circuit, means responsve to movement of contact connections of an actuated station for removing said resistance and signals from the supervisory circuit to fully energize said controller winding and cause its contacts to close said signal circuts in accordance with the code sequence of the actuated station without fully energizing said impulse transmitting device, and means at each station operable independently of said station contacts to fully energize said impulse transmitting device, and thereby cause the intermittent energization of said controller winding to operate said signals without code significance.

11. In an electric signaling system, the combination with transmitting stations each including contacts with connections therebetween, and means for repeatedly changing said contact connections upon the actuation of a station, in accordance with a code sequence, signals, a resistance between said station contacts and signals, a controller having a winding in a closed supervisory circuit including said station contacts, signals and resistance, and signal energizing circuits including normally open contacts operable by said controller, with the flow of supervisory current through said controller winding being insufficient to cause closure of its contacts, or to operate said signals, of a thermally operated device for transmitting current impulses intermittently, included in the supervisory circuit, means responsive to movement of the contact connections of an actuated station to fully energize said controller winding and cause its contacts to open and close said signal circuits, in accordance with the code designation of the actuated station, without passng sufficient current through said thermally operated device to cause it to function, and means at each station for establishing a direct circuit through said transmitting device independently of said station contacts, for causing the intermittent energization of said controller winding to operate said signals without code significance.

JOHN H. WHEELOCK.